United States Patent
Goris et al.

(10) Patent No.: US 7,428,009 B2
(45) Date of Patent: Sep. 23, 2008

(54) MANUAL WHITE BALANCE USING ARBITRARY SURFACE

(75) Inventors: Andrew C. Goris, Loveland, CO (US); Miles Kevin Thorland, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 10/782,320

(22) Filed: Feb. 19, 2004

(65) Prior Publication Data

US 2005/0185065 A1    Aug. 25, 2005

(51) Int. Cl.
*H04N 9/73* (2006.01)
(52) U.S. Cl. .................... 348/223.1; 348/229.1
(58) Field of Classification Search ............ 348/223.1, 348/224.1, 227.1, 228.2, 229.1, 348; 358/516; 382/167
See application file for complete search history.

(56) References Cited

U.S. PATENT DOCUMENTS

| | | | |
|---|---|---|---|
| 5,119,178 A * | 6/1992 | Sakata et al. | 348/223.1 |
| 5,589,879 A | 12/1996 | Saito et al. | |
| 6,075,562 A * | 6/2000 | Sakaguchi et al. | 348/223.1 |
| 2002/0080245 A1* | 6/2002 | Parulski et al. | 348/223 |
| 2003/0112342 A1* | 6/2003 | Takeuchi | 348/223.1 |
| 2004/0212685 A1* | 10/2004 | Smith et al. | 348/207.99 |

* cited by examiner

*Primary Examiner*—Yogesh Aggarwal

(57) ABSTRACT

A digital camera is equipped with signal processing circuits that achieve white balance by calibrating CCD detector outputs to a non-standard target, such as the palm of a person's hand or a camera lens cover. The calibration technique avoids the necessity of using a standard target to calibrate the digital camera under field use conditions.

11 Claims, 4 Drawing Sheets

MANUAL WHITE BALANCE USING ARBITRARY SURFACE

BACKGROUND OF THE INVENTION

1. Field of the Invention

The invention pertains to the field of digital imaging and, more particularly, to white balance control for adjustment of color or shade under variable lighting conditions.

2. Discussion of the Related Art

Many digital cameras and imaging devices use an array of charge-coupled device (CCD) detectors to capture the image. Each CCD detector accumulates a charge when exposed to light. The magnitude of charge represents the intensity of the light to which the CCD detector has been exposed. Each CCD detector is coupled to an analog to digital converter (A/D) that produces a digital signal representing the charge and intensity of light received by the CCD detector. Color images are captured by placing a color filter before each CCD detector. For example, a grouping of CCD color detectors may include two green detectors, a red detector and a blue detector. The color composition of an image is captured by taking the digital value of each detector according to color type. By way of example, U.S. Pat. No. 5,995,142 issued to Matsufune shows circuitry for capturing color images where analog signals from the CCD detectors are sorted into color channels, subjected to analog processing via a variable gain amplifier at the channel level, and converted to digital signals.

Complimentary metal oxide semiconductor (CMOS) detectors may be used in place of CCD detectors. CMOS detectors differ from CCD detectors in that CMOS detectors provide a continuous signal representing light intensity, whereas CCD detectors are integrating devices. Collectively, CCD detectors, CMOS detectors, and other useful forms of photodetectors or photodiodes are referred to herein as "detectors.

It is problematic in the art of digital photography that the digital cameras are used under variable light conditions. The signal received at each CCD detector may vary, for example, depending upon the type of light source even when the total intensity of light between two different sources is the same. These variations occur because different light sources differ in their emission spectra. As compared to natural sunlight, the emissions from a tungsten source contain more red light than blue or green light. If a digital camera is tuned or calibrated for natural sunlight, the resulting image under a tungsten source has an undesirable reddish/orange appearance. In addition, even ambient light from the same type of source may vary in intensity and composition, for example, as natural sunlight that is filtered by clouds or by atmosphere according to the season of the year. These problems are mitigated by providing digital cameras with white balance adjustments.

White balance is achieved when the image of a neutral white object produces equalized or normalized signals in each of the red, blue and green CCD detector channels. A digital camera that is tuned or calibrated to achieve white balance under one set of illumination conditions is not necessarily calibrated for a different set of illumination conditions. As shown in the '142 patent to Matsufune, one method for overcoming this problem is to alter the gain of the variable gain amplifiers according to principles of calibration involving the adjustment of variable gain coefficients. The '142 patent shows a system for scanning an image according to a calibration algorithm that follows a blackbody radiation pattern. The blackbody radiation pattern is used to adjust or select the scan area that is used for white balance adjustment purposes, in combination with stored standardized calibration data representing the color white.

Yet another white balance adjustment technique is described in U.S. Pat. No. 6,411,331 issued to Sansom-Wai et al. Circuitry is coupled to a CCD array for generating uncorrected digital image data including a chromaticity value and a luminance value for each of a plurality of pixels. A control circuit maps a two dimensional representation of the uncorrected image to select a spatial region that is used for calibration purposes in making the white balance adjustment.

U.S. Pat. No. 6,249,323 issued to Van Der Voort describes non-scanning circuitry that sets variable gain coefficients by equalizing chromiluminsence signals to achieve white balance. The variable gain coefficients may be manually set through adjustment of a variable resistor, or they may be set automatically in response to input signals, e.g., from an imaged calibration target of the color white or a specified shade of gray. Gain correction is performed according to a mathematical algorithm that exponentially and proportionally relate the input signals to stored reference signals for the calibration target.

U.S. Pat. No. 6,038,339 issued to Hubel et al. describes a variety of mathematical techniques that may be used to calculate white balance and describes improvements that pertain to correcting color of the image based on the illumination type. A correlation matrix memory or associative matrix memory is used to achieve identical results to the known color-in-perspective method. The methods are improved by adding Bayesian or other correlation statistics. The correlation matrix memory is built to correlate the data from any picture image to reference images under a range of illumination type. When a camera, scanner, or the like, produces a picture image, the data is converted to chromaticity and a vector is created corresponding to the values existing in the scene. This vector is multiplied by each column in the correlation matrix to establish a new matrix. Each column is then summed, and the resulting values form a vector that is compared to stored reference information representing the likelihood of each reference source being the illumination type for the scene. The vector values can be density plotted where each value is plotted at the chromaticity of the illumination for that particular column. From this plot normal statistical methods are used to estimate the likely illumination type of the scene. Greatly reduced computational requirements result because simple binary matrix algorithms replace complex geometrical calculations.

None of the foregoing references address a more practical problem that is commonly encountered by photographers. The quality of photographic images is enhanced by calibrating digital cameras under actual conditions of illumination encountered as the photographs are being taken. Calibration of this type requires that the photographer have access to a calibration target. The calibration target is frequently specified as white paper having 18% gray. The target is subject to degradation under conditions of actual use, such as contamination with grime, creasing, or tearing. Nothing in the art addresses the practical problem of having to produce a pristine calibration target in the field.

SUMMARY

Features described herein advance the art and overcome the problems outlined above by providing an imaging device, such as a digital still camera or digital motion picture camera, with white balance adjustment logic that permits the use of alternative calibration targets other than the standard calibration target that is specified by the manufacturer for use in adjusting white balance.

According to one aspect, the imaging device includes image capture circuitry that is configured to produce captured image signals. The captured image signals are, respectively, obtained as a primary image of a standard target that comports with manufacturer specifications for use in making white balance adjustments, and a secondary image of a non-standard target. The primary image and the secondary image are obtained under identical illumination conditions. The non-standard target is, for example, the palm of a photographer's hand, or a camera lens cover. Signal processing circuitry processes the primary image to obtain a first reference metric, such as a variable gain coefficient for use on at least one of a red, blue or green channel (RGB). It will be appreciated that additional channels may be utilized, for example, by adding a yellow or orange channel to RGB. The signal processing circuitry processes the secondary image, e.g., in an identical manner with respect to the primary image, to obtain a second reference metric. The photographer is then able to obtain a field image of the non-standard target under different illumination conditions. The signal processing circuitry processes the field image to obtain a third reference metric and relates the third reference metric to at least one of the first reference metric or the second reference metric, to calibrate the camera in adjusting white balance.

By way of example, the reference metrics may all be variable gain coefficients for use in adjusting the output of a charge coupled device array. A variable gain coefficient is hereby defined to include a value, or a digital or analog representation of a value, that may be input to a variable gain amplifier for use in adjusting the output of the variable gain amplifier.

In one embodiment, the signal processing circuitry may be operable for determining at least one variable gain coefficient for the field image, determining at least one variable gain coefficient for the primary image, relating the variable gain coefficient for the field image to the variable gain coefficient for the primary image to produce an adjusted variable gain coefficient, and supplying the adjusted variable gain coefficient to the circuitry for use in adjusting white balance.

Another embodiment pertains to a method for adjusting white balance in an imaging device. The method includes a step of capturing image signals from a field image of a non-standard calibration target, and a primary image of a standard calibration target, to produce a captured field image and a captured primary image. The captured field image is related to the captured primary image to provide calibration for adjustment of white balance. White balance is adjusted by applying the calibration, for example, by enabling an adjusted variable gain coefficient on a variable gain amplifier.

In one aspect, the step of enabling an adjusted variable gain coefficient may include calculating a relationship between a variable gain coefficient for the field image and a variable gain coefficient for the primary image. This may be accomplished by determining at least one variable gain coefficient for the field image, determining at least one variable gain coefficient for the primary image, relating the variable gain coefficient for the field image to the variable gain coefficient for the primary image to produce the adjusted variable gain coefficient, and supplying the adjusted variable gain coefficient to the signal processing circuitry.

Upon reading the following detailed description, in addition to the accompanying drawings, those skilled in the art will appreciate that additional features and advantages are disclosed.

DETAILED DESCRIPTION

Figure 1:
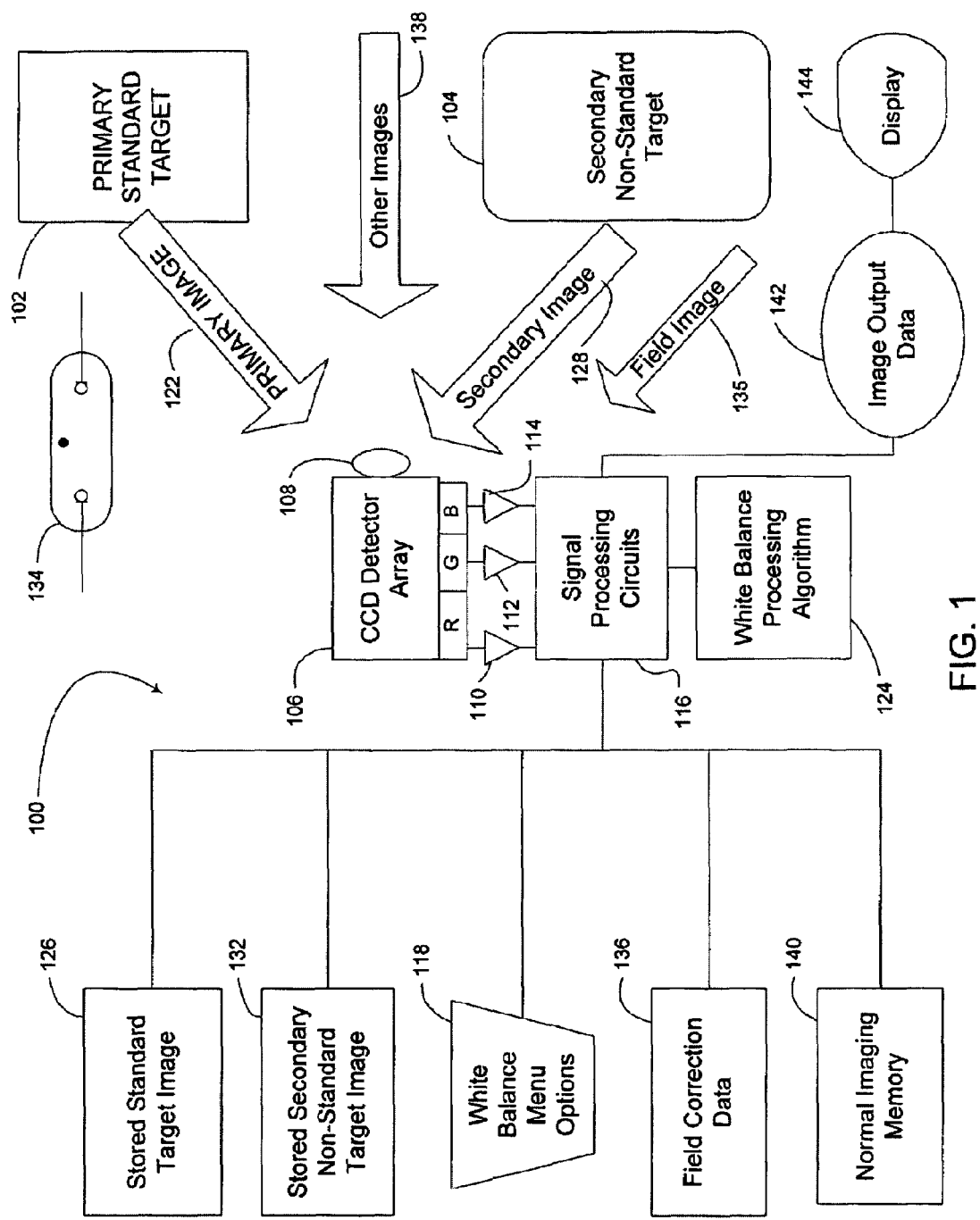
FIG. 1 is a block schematic diagram of one camera that achieves white balance using a non-standard calibration target.

FIG. 1 is a block schematic diagram showing one embodiment of a digital camera 100 that may be calibrated for white balance adjustment using a primary standard target 102 and a secondary non-standard target 104. The digital camera 100 contains a detector array 106 on which is focused a lens 108. The detector array 106 is organized into channels including a red channel R, a green channel G and a blue channel B. Additional color channels or fewer color channels may be used. By way of example, the channels R, G and B represent signal output pathways from optically filtered CCD detectors in the detector array 106, or from optically filtered CMOS detectors. Analog output from the detector array 106 is adjusted by gain coefficients that are, respectively, applied to a red channel variable gain amplifier 110, a green channel variable gain amplifier 112 and a blue channel variable gain amplifier 114. The respective gain coefficients of amplifiers 110, 112, 114 are calibrated to achieve white balance. Signal processing circuits 116 operate on signals from the respective variable gain amplifiers 110, 112, and 114 to provide digital image representations. It will be appreciated that the signal outputs from the R, G and B channels may be combined into a single channel for black and white or grey-scale image processing.

According to one embodiment, a user chooses a white balance technique from a list of white balance menu options 118. The signal processing circuits 116 are able to select from a variety of variable gain coefficient calculation techniques or functions according to the white balance menu options. For example, white balance menu options 118 present the user with selections to identify (1) the white balance control technique, and (2) the type of light source for a particular white balance control technique. The variable gain coefficients are generated by the signal processing circuits 116 according to the user-selected option from white balance menu options 118 and enabled on the variable gain amplifiers 110, 112, and 114. By way of example, the signal processing circuits 116 are provided with predetermined variable gain coefficients that achieve white balance under presumed average conditions of illumination for menu-selectable options including sunlight, tungsten lighting, and/or fluorescent lighting.

In one embodiment, the white balance menu options 118 permit the user to achieve white balance using a primary standard target 102 under ambient light conditions. The user manipulates camera 100 to obtain a primary image 122 from the primary standard target 102, which comports with manufacturer-specified standardization requirements for use as a white balance calibration tool, e.g., a white target with 18% gray. The signal processing circuits 116 access a white balance processing algorithm 124 to calculate appropriate variable gain coefficients, $P_C$, that are enabled on the variable gain amplifiers 110, 112, and 114 to achieve white balance. Data from the signal processing circuits 116, and/or calculation results from white balance processing algorithm 124 including the variable gain coefficients, are stored as a stored standard target image 126. The white balance processing algorithm 124 is implemented using digital circuitry and/or analog circuitry, and/or using a processor configured with program instructions.

In yet another embodiment, after obtaining the primary image 122, the user manipulates camera 100 to obtain a secondary image 128 from the secondary non-standard target 104. The primary image 122 and the secondary image 128 are captured in close time proximity to one another and with similar positioning of camera 100 to assure that the respective images 122, 128, are exposed to the same intensity of light under the same type of light source. The secondary non-standard target 104 need not comport with manufacturer-specified standardization requirements for use as a white balance calibration target, and may be any object other than the primary standard target 102. By way of example, the secondary non-standard target 104 is the palm of the user's hand, a camera lens cover, a wallet, or a painted wall in a photography studio. The signal processing circuits 116 access the white balance processing algorithm 124 to generate appropriate variable gain coefficients that are enabled on the variable gain amplifiers 110, 112, and 114. Data from the signal processing circuits 116, and/or calculation results of white balance processing algorithm 124 including the variable gain coefficients, are stored as a stored secondary non-standard target image 132. In this embodiment, the white balance processing algorithm 124 determines the channel-specific variable gain coefficients $S_C$ that achieve white balance for the secondary non-standard target 104 and correlates these coefficients to the variable gain coefficients $P_C$ for the primary standard target, e.g., by determining a channel-specific signal multiplier $M_C$ as:

$$M_C = f_1(P_C, S_C), \quad (1)$$

where $P_C$ is the channel-specific variable gain coefficient for the primary standard target 102 under a condition of illumination, $S_C$ is the channel-specific variable gain coefficient for the secondary standard target image under the same condition of illumination, and $f_1$ is a function of $P_C$ and $S_C$ relating the output of detector array 106 to different intensities of illumination. For example, $f_1$ is a straight ratio or proportion of $P_C/S_C$, where the detector array 106 provides a charge output that is linearly related to the intensity of light contacting the detector array 106. The function $f_1$ can be an empirical correlation relating $M_C$ as a ratio, product, sum or difference of $P_C$ and $S_C$. For example, $f_1$ can be a least square fit of empirical data for an illumination condition under tungsten light. A different function $f_1$ can be used for illumination conditions under direct sunlight, shade, or fluorescent light. The function $f_1$ can differ for each or the R, G and B channels. Signal processing circuits 116 enable the variable gain coefficients $P_C$ on the corresponding variable gain amplifiers 110, 112 and 114.

The foregoing calibration technique merely determines a relationship between $P_C$ and $S_C$ under uniform conditions of illumination. For example, the uniform conditions of illumination may occur by obtaining the primary image 122 and the secondary image 128 in close time proximity of less than from one to five minutes under lighting from a fluorescent source 134. Alternatively, fluorescent source 134 may be replaced by sunlight or by tungsten lighting, for example. Once the value $S_C$ has been obtained, there is no longer any need for the primary standard target 102.

In this embodiment, the user travels to a different location, for example, one that is illuminated by a different type of light other than fluorescent source 134. At this new location, the user accesses the white balance menu options 118 to select a field calibration mode. In this mode, the user further chooses from illumination source options, such as direct daylight, tungsten, fluorescence, and shade, which all are associated with different calibration functions described below. The user obtains field image 135 of secondary non-standard target 104, which is submitted to signal processing circuits 116 and white balance processing algorithm 124 to obtain channel-specific variable gain coefficients $F_C$ that achieve white balance on the basis of secondary non-standard target 104 in the field. The field image 135 and/or variable gain coefficients $F_C$ are stored as field correction data 136.

In the embodiment that uses the above Equation (1), signal processing circuitry 116 adjusts the variable gain coefficients $P_C$ applied to the variable gain amplifiers the 110, 112, 114 by enabling $P_A$ in place of $P_C$ according to Equation (2):

$$P_A = M_C F_C, \quad (2)$$

where $P_A$ is a channel-specific variable gain coefficient calibrated for field conditions of ambient light, as measured in field image 135.

In another embodiment, a function $f_2$ is empirically derived as a correlation to adjust white balance between different intensities for each channel, e.g., by using a factory-calibrated least squares algorithm relating $P_A$ as a function of $F_C$ and $S_C$:

$$P_A = f_2(F_C, S_C), \quad (3)$$

where $f_2$ is an empirical function relating $F_C$ and $S_C$ to $P_A$. It will be appreciated that function $f_2$ can be an empirical function relating $P_A$ as a ratio, product, sum or difference of $F_C$ and $S_C$. There may be as many types of function $f_2$ as there are for function $f_1$, e.g., channel-specific functions for conditions of direct sunlight, shade, tungsten light and fluorescent light.

Here it is also helpful to observe, in an ideal sense:

$$P_C = f_2(F_C, S_C) \text{ (when } F_C = S_C\text{)}, \quad (4)$$

which relationship may be used to confirm proper calibration of the camera 100 at the time of storing the stored secondary standard target image 132. If $P_C$ determined by Equation (4) differs from observed $P_C$ by more than a small amount, e.g., five percent, camera 100 may issue a user warning that calibration has failed.

With field calibration complete, the user accesses white balance menu options 118 to enter a normal photographic mode. In this mode, white balance is adjusted according to the variable gain coefficients that are enabled, respectively, on variable gain amplifiers 110, 112 and 114 according to a user-selected one of white balance menu options 118. The user is free to obtain other images 138 and process the same using image processing circuits 116. The processing results from other images 138 are stored in normal imaging memory 140. The signal processing circuits 116 may retrieve images from the normal imaging memory 140 to provide image output data 142, e.g., to a display 144.

Figure 2:
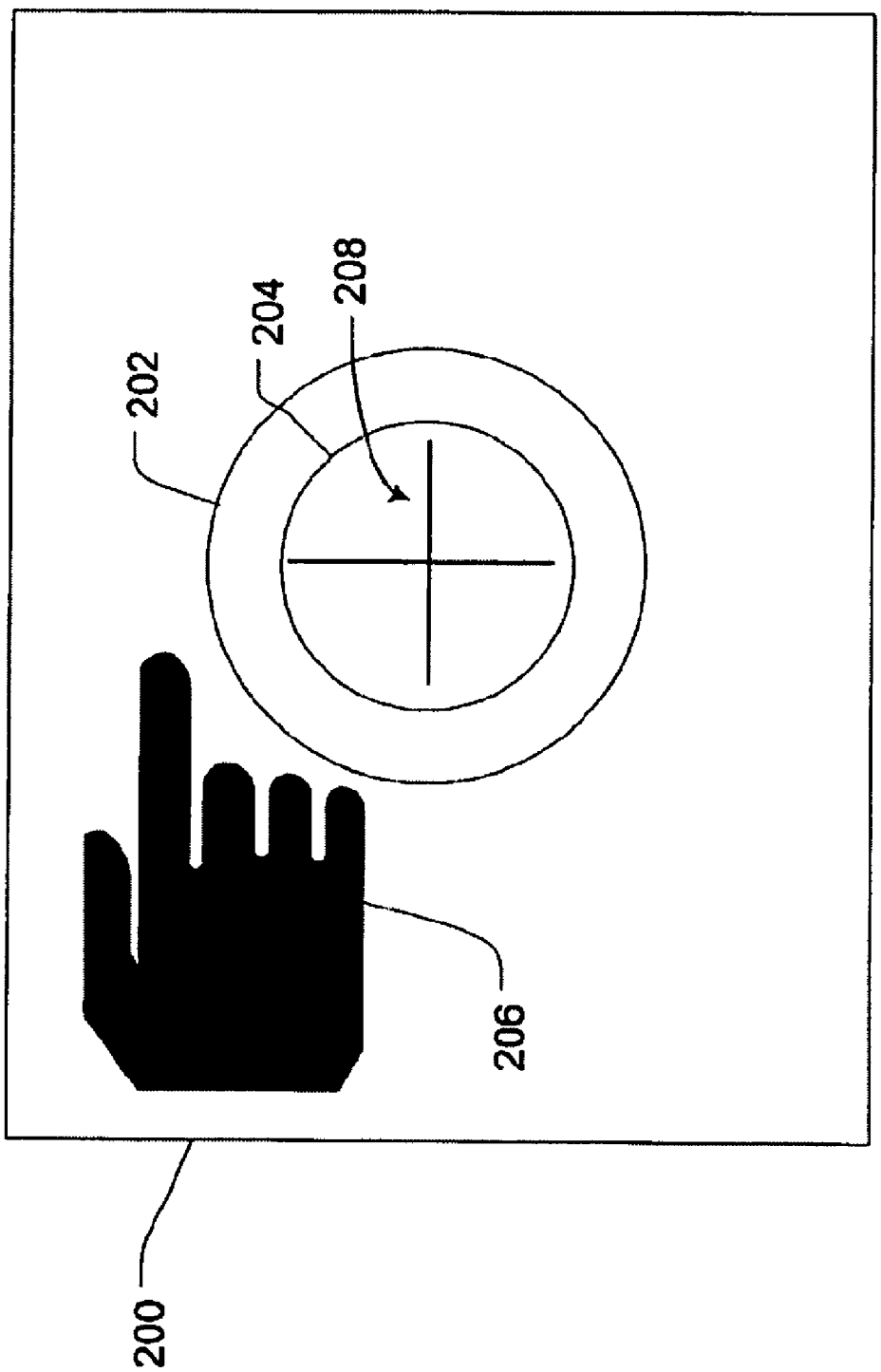
FIG. 2 shows one camera viewfinder and various non-standard calibration targets that may be used to achieve white balance.

FIG. 2 shows a rear view of a camera viewfinder 200 in the process of capturing secondary image 128 (FIG. 1) or field image 135. As shown in FIG. 2, the secondary image 128 is a camera lens cover 202 centered in a selection area 204 that appears in viewfinder 200. The secondary image 128 might alternatively be a hand 206 or other objects (not shown). The camera lens cover 202 may have a white color to facilitate achieving white balance, or it may have multiple colors, for example, divided into quadrants 208 that may be selectively aligned with the selection area 204.

Figure 3:
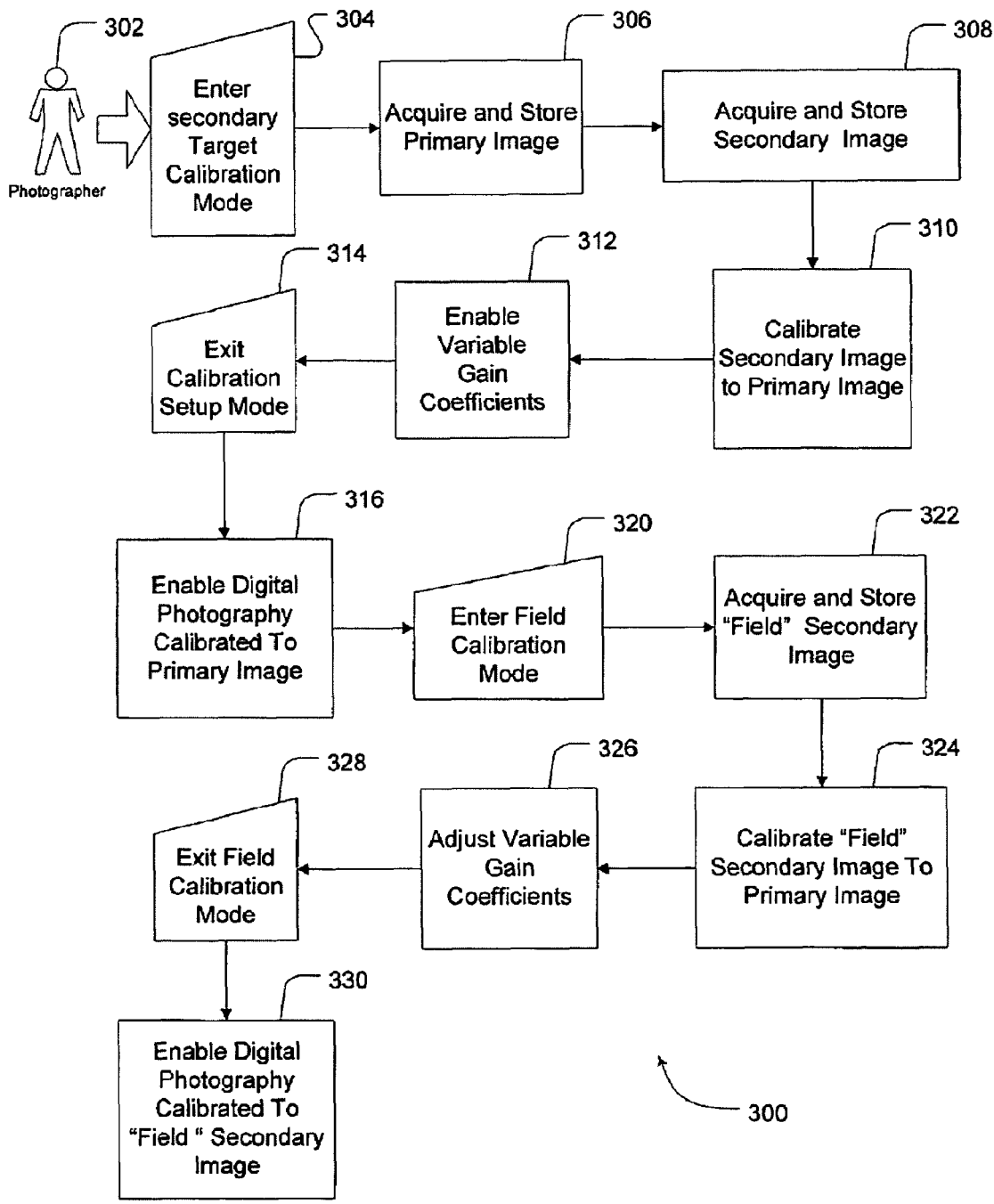
FIG. 3 diagrams one process for white balance adjustment using a non-standard calibration target.

FIG. 3 diagrams process 300, which illustrates one embodiment of a method for calibrating camera 100 (FIG. 1). Process steps discussed herein are referenced in the context of FIGS. 1 and 3. A photographer 302 enters secondary target calibration mode 304 by manually selecting an appropriate one of white balance menu options 118, then proceeds to acquire and store 306 a primary image 122 (shown in FIG. 1). The next step is to acquire and store 308 the secondary image 128. Where the embodiment relating to Equation (1) is in effect, step 310 calculates $M_C$, thus calibrating the secondary image 128 to primary image 122. In another embodiment, step 310 may be performed using Equation (4) to confirm that white balance has been achieved. The variable gain coefficients $P_C$ are enabled on variable gain amplifiers 110, 112, and 114 in step 312. In step 314, the photographer 302 exits calibration setup mode. At this time, in step 316 camera 100 is enabled for photography calibrated to the primary image because the variable gain coefficients are enabled on variable gain amplifiers 110, 112 and 114.

When the photographer 302 decides to enter field calibration mode 320, this is accomplished by manual interaction with white balance menu options 118, whereupon step 322 entails acquiring and storing a field image 135 of the secondary non-standard target 104. In step 324, signal processing circuits 116 determine $F_C$ variable gain coefficients for white balance of the field image 135 to the primary image, e.g., by application of Equations (1), (2) and/or (3). In step 326, signal processing circuits 116 adjust the variable gain coefficients that are enabled on variable gain amplifiers 110, 112 and 114 by replacing the $P_C$ coefficients with $P_A$ coefficients on each channel R, G and/or B. Photographer 302 may now exit 328 field calibration mode. Camera 100 is next enabled 330 with digital photography calibrated to the "field" secondary image 135 permitting capture of other images 138.

Figure 4:
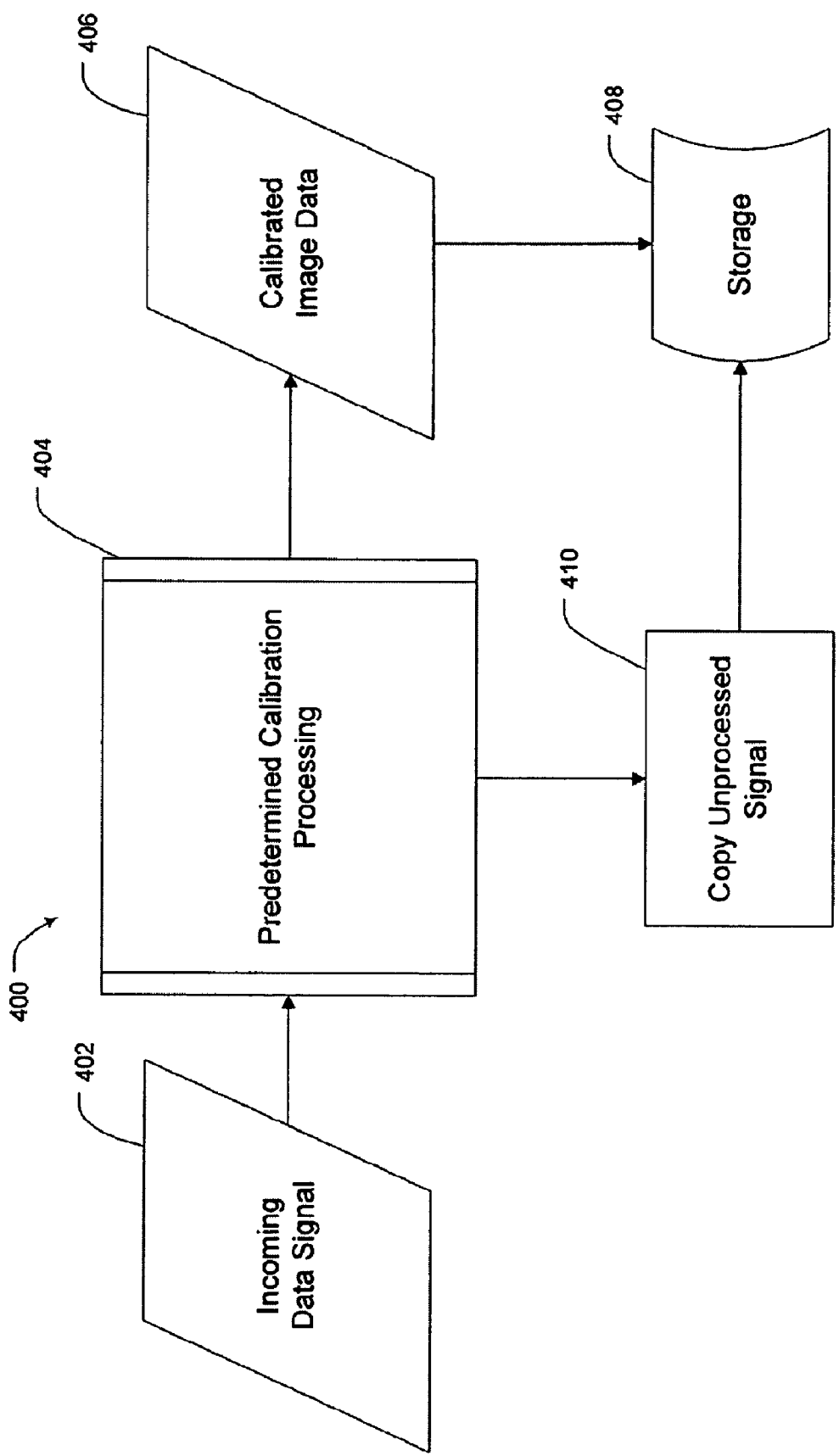
FIG. 4 is a process diagram showing data flow for white balance adjustment using non-standard calibration targets.

FIG. 4 shows a data flow process 400 of one embodiment for calibrating an incoming data signal 402 representative of an image captured by camera 100. The incoming data signal 402 may be an analog signal or a digital representation of an other image 138. Predetermined calibration processing 404 is performed, for example, to enable the variable gain coefficients $P_A$ on the variable gain amplifiers 110, 112, and/or 114. The predetermined calibration processing 404 may generate variable gain coefficients through analog signal processing circuitry or, for example, through a program logic implementing Equations (1), (2), and/or (3). The predetermined calibration processing step 404 produces calibrated image data 406, which may be transferred to storage 408. Step 404 may advantageously generate a copy or representation of the incoming data signal 402, e.g., the raw data signal in unprocessed form together with calibration parameters that could be applied, in order to permit processing of the incoming data signal by other means, such as a separate computer (not shown). Thus, white balance may be achieved in a distributed processing environment, such as by a separate computer accessing storage 408.

The foregoing discussion is intended to illustrate the features way of example with emphasis upon certain embodiments and instrumentalities. Accordingly, the disclosed embodiments and instrumentalities are not exhaustive of all options or mannerisms for practicing the disclosed principles hereof. The inventors hereby state their intention to rely upon the Doctrine of Equivalents and the following claims in protecting the full scope and spirit hereof.

We claim:

1. An imaging device with white balance adjustment, comprising:

image capture circuitry configured to produce captured image signals under identical illumination conditions for each of a standard calibration target to provide a first reference metric under the identical illumination conditions and for a nonstandard calibration target to produce a second reference metric under the identical illumination conditions, means for capturing a second group of captured image signals from the nonstandard calibration target under changed illumination conditions that differ from the identical illumination conditions to produce a third reference metric, and;

means for adjusting white balance in the second group of captured image signals by relating the third reference metric to the second reference metric.

2. The imaging device of claim 1, wherein the image capture circuitry includes a detector selected from the group consisting of a CCD detector array and a CMOS detector array.

3. The imaging device of claim 2, wherein the means for adjusting white balance include signal processing circuitry capable of changing variable gain coefficients enabled on the charge coupled device array.

4. The imaging device of claim 3, wherein the means for adjusting comprises an algorithm for relating a field image of a non-standard target to a primary image of a standard calibration target through use of the second reference metric.

5. The imaging device of claim 4, wherein the algorithm is operable for:

determining at least one variable gain coefficient for the field image, determining at least one variable gain coefficient for the primary image, relating the variable gain coefficient for the field image to the variable gain coefficient for the primary image to produce an adjusted variable gain coefficient, and supplying the adjusted variable gain coefficient to the means for adjusting white balance.

6. The imaging device of claim 1, wherein the nonstandard calibration target is a human hand.

7. A method for adjusting white balance in an imaging device, the method comprising the steps of: capturing image signals under identical illumination conditions for each of a standard calibration target to provide a first reference metric under the identical illumination conditions and for a non-standard calibration target to produce a second reference metric under the identical illumination conditions, capturing a second group of captured image signals from the nonstandard calibration target under changed illumination conditions that differ from the identical illumination conditions to produce a third reference metric, and;

adjusting white balance in the second group of captured image signals by relating the third reference metric to the second reference metric.

8. The method of claim 7, wherein the step of adjusting white balance comprises enabling an adjusted variable gain coefficient on a variable gain amplifier.

9. The method of claim 8, wherein the step of enabling an adjusted variable gain coefficient comprises calculating a relationship between a variable gain coefficient for the field image and a variable gain coefficient for the primary image.

10. The method of claim 9, wherein the step of calculating includes: determining at least one variable gain coefficient for the field image, determining at least one variable gain coefficient for the primary image, relating the variable gain coefficient for the field image to the variable gain coefficient for the primary image to produce the adjusted variable gain coefficient, and supplying the adjusted variable gain coefficient to signal processing circuitry for use in normal photography.

11. The method of claim 7, wherein the step of capturing image signals includes capturing the field image from the non-standard calibration target selected from the group consisting of a palm, a wallet, and a camera lens cover.

* * * * *